(12) United States Patent
Yamada

(10) Patent No.: US 8,125,499 B2
(45) Date of Patent: Feb. 28, 2012

(54) DEVICE HAVING FUNCTION OF ROTATING IMAGE

(75) Inventor: Jun Yamada, Gifu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 866 days.

(21) Appl. No.: 12/163,253

(22) Filed: Jun. 27, 2008

(65) Prior Publication Data

US 2009/0002395 A1 Jan. 1, 2009

(30) Foreign Application Priority Data

Jun. 29, 2007 (JP) ................................. 2007-172529

(51) Int. Cl.
*G09G 5/00* (2006.01)
(52) U.S. Cl. ........................................................ 345/659
(58) Field of Classification Search .................... 345/659
See application file for complete search history.

(56) References Cited

U.S. PATENT DOCUMENTS

| 5,774,233 | A | 6/1998 | Sakamoto |
| 6,115,025 | A * | 9/2000 | Buxton et al. ................. 345/659 |
| 6,567,101 | B1 * | 5/2003 | Thomas .......................... 345/649 |
| 6,750,989 | B1 | 6/2004 | Kamada et al. |
| 2003/0218785 | A1 | 11/2003 | Sato |
| 2005/0111042 | A1 * | 5/2005 | Ogiwara ...................... 358/1.18 |
| 2006/0012716 | A1 | 1/2006 | Choi |
| 2006/0017994 | A1 | 1/2006 | Takiyama |

FOREIGN PATENT DOCUMENTS

| CN | 1764929 | 4/2006 |
| JP | 05-145712 | 6/1993 |
| JP | 2000-293111 | 10/2000 |
| JP | 2001-036727 | 2/2001 |
| JP | 2001-045239 | 2/2001 |
| JP | 2001-075546 | 3/2001 |
| JP | 2004-222328 | 8/2004 |
| JP | 2006-259358 | 9/2006 |
| JP | 2002-190940 | 7/2007 |
| WO | 2004-111932 | 12/2004 |

OTHER PUBLICATIONS

Examination Report issued in the corresponding European Application No. 08011529.8 dated Aug. 8, 2010.
Notice of Reasons of Rejection for Japanese Application No. 2007-172529 Mailed Jun. 23, 2009.
European Search Report Application No. 08011529.8; mailed Jun. 25, 2009.
Examination Report issued in the corresponding European Application No. 08011529.8 dated Aug. 30, 2010 (corrected date).
First Office Action for Chinese Application No. 2008101274588 dated Dec. 25, 2009.
Summons to attend oral proceedings pursuant to Rule 115(1) EPC dated Sep. 22, 2011 in European Application No. 08011529.8.

* cited by examiner

*Primary Examiner* — Jeffrey Chow
(74) *Attorney, Agent, or Firm* — Banner & Witcoff, Ltd.

(57) ABSTRACT

There is provided a device comprising: a display unit configured to display an image corresponding to image data and to be rotatable with respect a body case of the device; a detection unit configured to detect a rotation angle of the display unit; and a data processing unit configured to process the image data to rotate the image in accordance with a rotation angle of the display unit detected by the detection unit.

10 Claims, 14 Drawing Sheets

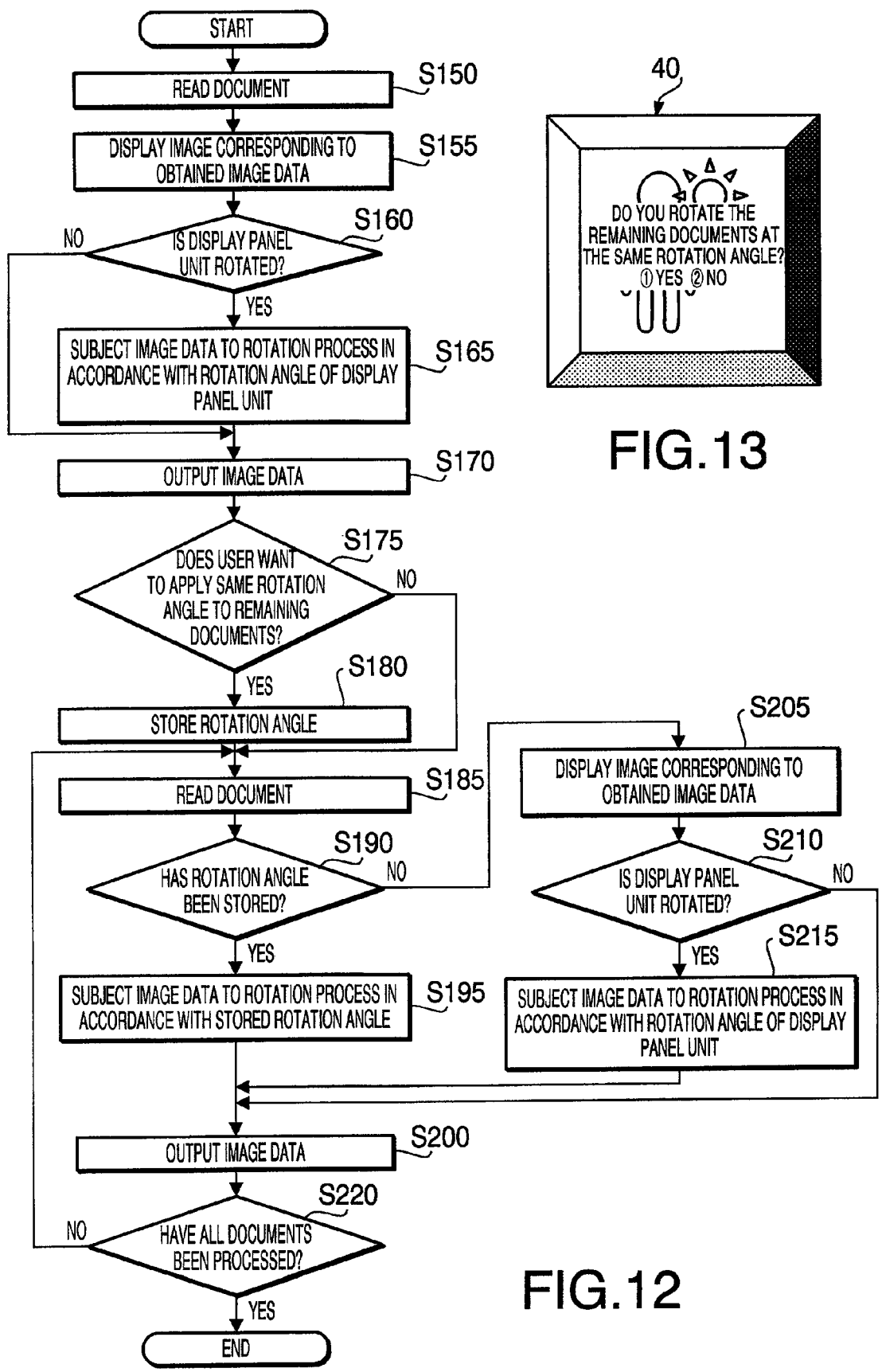

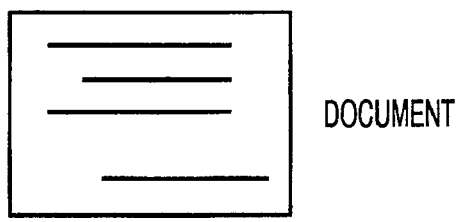
FIG.16A DOCUMENT
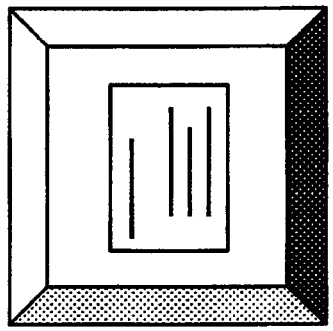
FIG.16B
FIG.16C
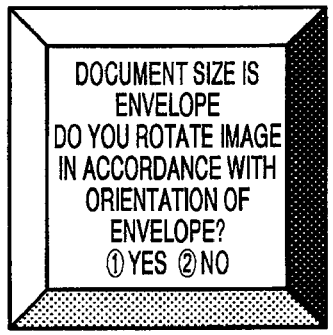
FIG.16D
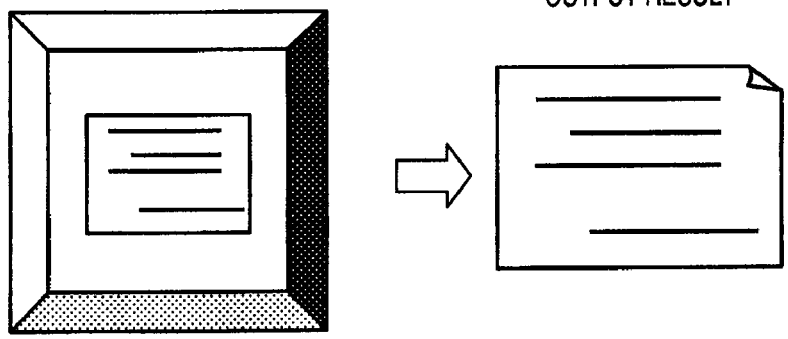
OUTPUT RESULT

DEVICE HAVING FUNCTION OF ROTATING IMAGE

CROSS-REFERENCE TO RELATED APPLICATION

This application claims priority under 35 U.S.C. §119 from Japanese Patent Application No. 2007-172529, filed on Jun. 29, 2007. The entire subject matter of the application is incorporated herein by reference.

BACKGROUND

1. Technical Field

Aspects of the present invention relate to a device having a function of reading an image from a document and outputting the read image.

2. Related Art

Various types of devices having image reading and outputting functions have been widely used. Japanese Patent Provisional Publication No. 2001-45239 (hereafter, referred to as JP 2001-45239A) discloses an example of a scanner device configured such that pre-scanning is executed to form a preview image of a document and the preview image can be rotated on a screen in accordance with the number of times that a rotation button is pressed by a user. The user is able to change orientation of an obtained image without changing orientation of a document placed on the scanner device.

However, the scanner device disclosed in JP 2001-45239A has a drawback that the user is not able to rotate the displayed image through an intuitive operation because the displayed image is rotated through the user operation of pressing the rotation button.

SUMMARY

Aspects of the present invention are advantageous in that a device capable of allowing a user to rotate a displayed image through an intuitive user operation is provided.

According to an aspect of the invention, there is provided a device comprising: a display unit configured to display an image corresponding to image data and to be rotatable with respect a body case of the device; a detection unit configured to detect a rotation angle of the display unit; and a data processing unit configured to process the image data to rotate the image in accordance with a rotation angle of the display unit detected by the detection unit.

Such a configuration enables a user to rotate the image through an intuitive user operation.

In at least one aspect, the device comprises a reading unit configured to read an image form a document. In this case, the display unit displays the image read by the reading unit.

In at least one aspect, the device comprises a print unit configured to print an image corresponding to the image data processed by the data processing unit.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 12 is a flowchart illustrating image data processing executed by the image formation device according to a fifth embodiment.

FIG. 13 is an example of a message displayed on the display panel unit.

FIGS. 16A-16D are explanatory illustrations for explaining image data processing for an envelope.

DETAILED DESCRIPTION

Hereafter, embodiments according to the invention will be described with reference to the accompanying drawings.

First Embodiment

Figure 1:
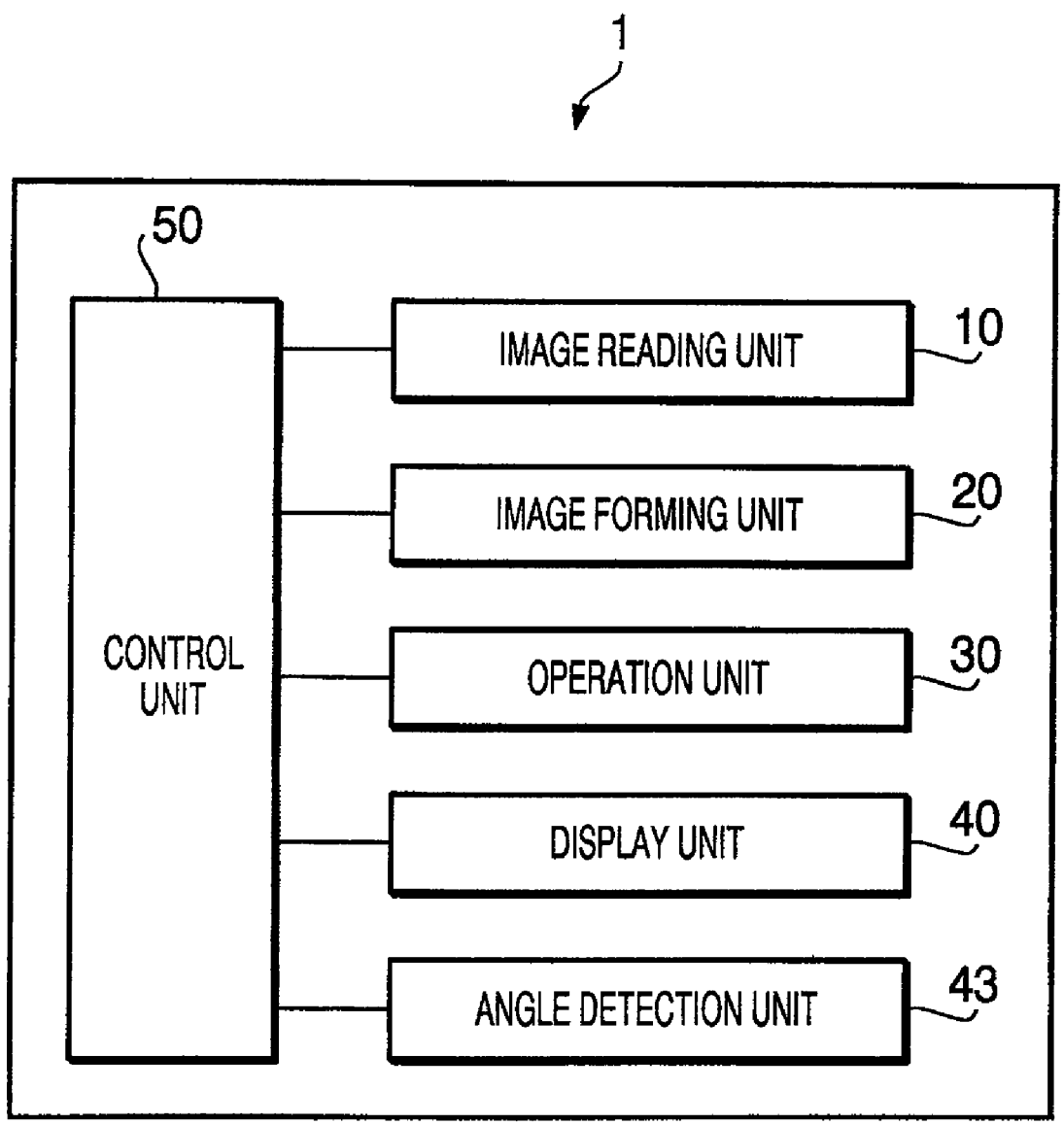
FIG. 1 is a block diagram of an image formation device according to a first embodiment.
Figure 2:
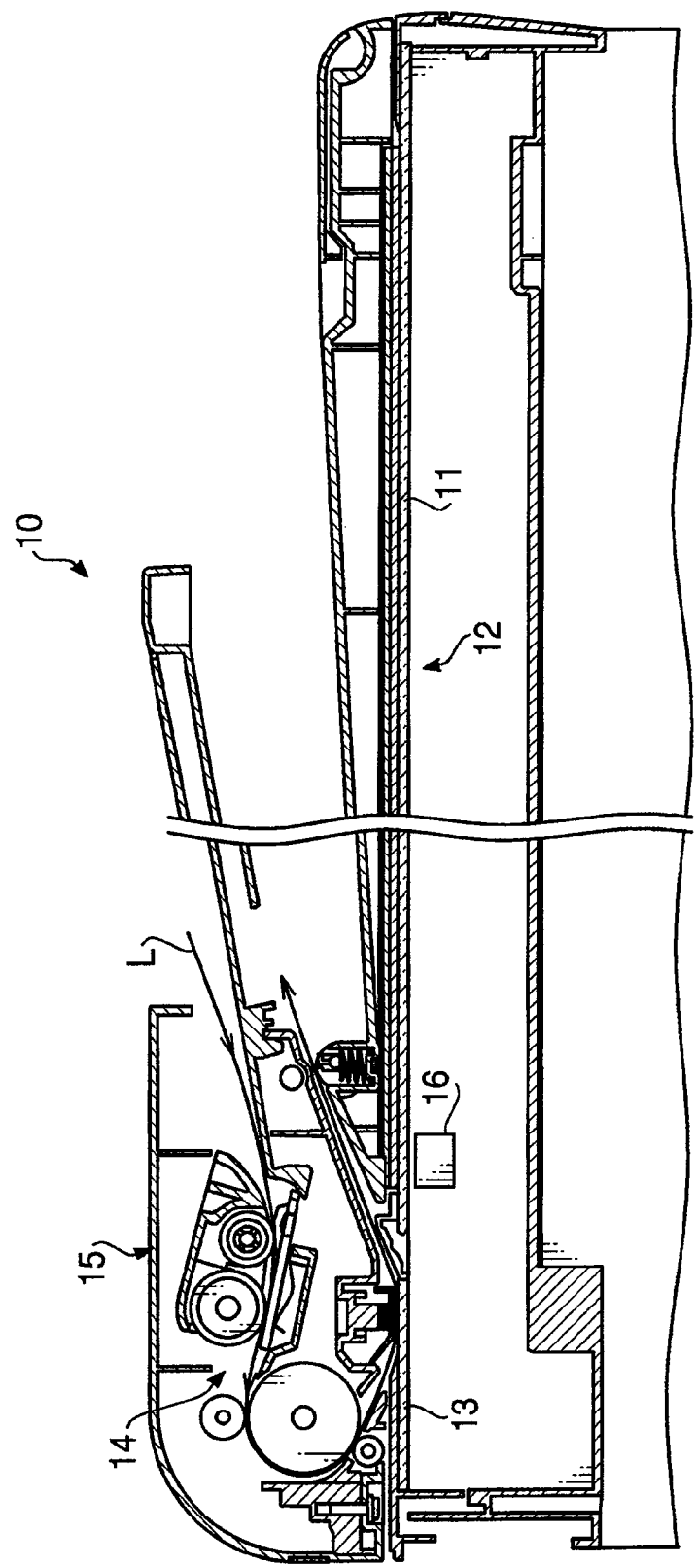
FIG. 2 is a cross-sectional view illustrating an internal structure of an image reading unit provided in the image formation device.

FIG. 1 is a block diagram of an image formation device 1 according to a first embodiment of the invention. The image formation device 1 has a scanner function and a printing function. As shown in FIG. 1, the image formation device 1 includes a control unit 50, an image reading unit 10, an image forming unit 20, an operation unit 30, a display unit 40 and an angle detection unit 43. FIG. 2 is a cross-sectional view illustrating an internal structure of the image reading unit 10.

The image reading unit 10 reads an image (i.e., information including images, text and etc.) from a document. The image forming unit 20 forms an image on a recording sheet.

As shown in FIG. 2, the image reading unit 10 includes a flat bed read unit 12 and an automatic read unit 15. In the flat bed read unit 12, a platen glass 11 is horizontally mounted so that a reading operation is executed for a document placed horizontally on the platen glass 11.

In the automatic read unit 15, an ADF (Automatic Document Feeder) 14 and an automatic feed read section 13 is provided. The ADF 14 feeds a document to the automatic feed read section 13.

Under the platen glass 11, an image pick-up device 16 is provided. To read an image from a document in the flat bed read unit 12, the image pick-up device 16 is controlled to read an image from a document while moving in an auxiliary scanning direction (i.e., in a lateral direction on FIG. 2). To read an image from a document in the automatic read unit 15, the image pick-up device 16 is positioned beneath the automatic feed read section 13, and reads an image from a document which has been carried by the ADF 14 through a feed path L.

Through the operation unit 30, various types of user operations (e.g., inputs of commands or settings) are accepted. The operation unit 30 and the display unit 40 on which various types of information can be displayed are mounted on a body case of the image formation device 1. The display unit 40 includes a display panel unit 41 (e.g., an LCD), a rotation shaft 42 which supports the display panel unit 41 so that the display panel unit 41 can be rotatable with respect to a barycenter of the display panel unit 41, and the angle detection unit 43 (see FIGS. 3-5).

Figure 5:
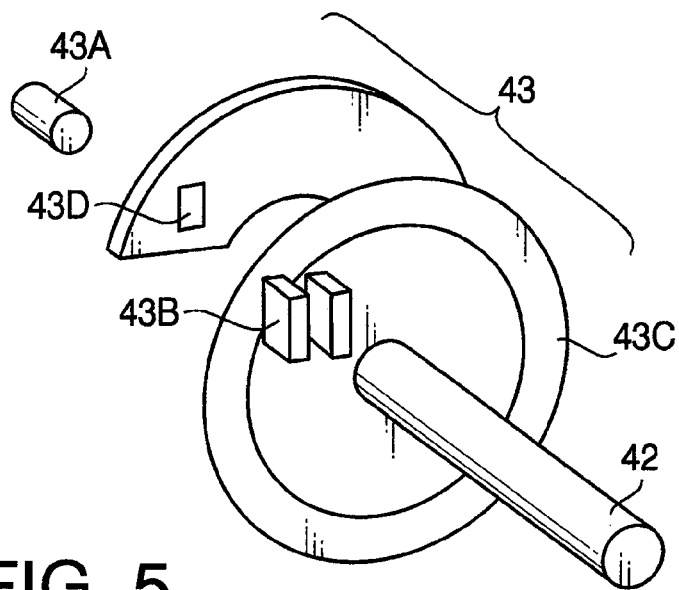
FIG. 5 is a conceptual diagram of an angle detection unit to detect a rotation angle of the display panel unit.

As shown in FIG. 5, the angle detection unit 43 is formed to be an optical rotary encoder including a light emission device 43A, a photoreceptor 43B, a rotational slit 43C having slits formed thereon, and a fixed slit 43D. The rotational slit 43C is placed on an optical path between the light emission device 43A and the photoreceptor 43B so that a state of passing light therethrough and a state of blocking light are switched depending on rotational positions thereof. The fixed slit 43D is placed to convert light emitted by the light emission device 43A into a light beam.

Figure 3:
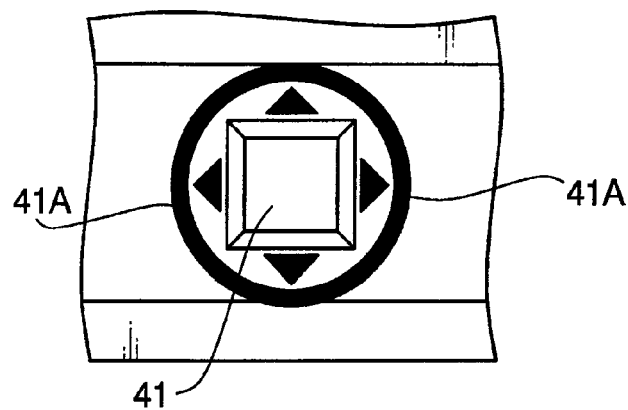
FIG. 3 is a plan view of a display panel unit provided in the image formation device.

As shown in FIG. 3, around the display panel unit 41, an operation base 41A used to rotate the display panel unit 41 is provided. By pressing and rotating the operation base 41A, the user is able to easily rotate the display panel unit 41 in a desired rotational direction together with rotations of the operation base 41A.

Figure 4:
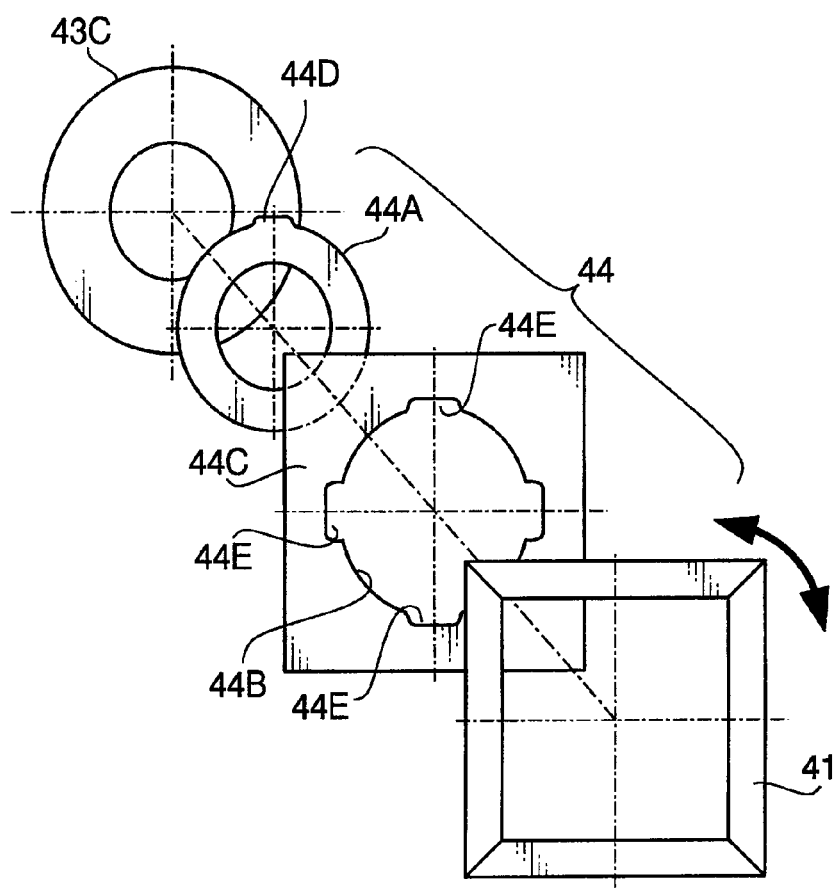
FIG. 4 is an exploded view illustrating a detailed structure of a display unit of the image formation device.

FIG. 4 illustrates a detailed structure of the display unit 40. As shown in FIG. 4, the display unit 40 includes an angle adjustment unit 44 configured to adjust the rotational position of the display panel unit 41 such that the display panel unit 41 is fixed at predetermined angular positions.

More specifically, the angle adjustment unit 44 includes a rotational plate 44A which rotates together with the rotation shaft 42, a fixed plate 44C in which an opening 44B is formed such that the rotational plate 44A is rotatable within the opening 44B. On outer periphery of the rotational plate 44A, a projection 44D is formed to protrude outwardly. On an inner periphery of the fixed plate 44C, recessed parts 44E are formed so as to allow the projection 44D of the rotational plate 44A to fit into each of the recessed parts 44E. In an example shown in FIG. 4, the recessed parts 44E are positioned at intervals of 90 degrees.

More specifically, when the fixed plate 44C rotates in the opening 44B, the projection 44D engages lightly with one of the recessed parts 44E at a predetermined angular position. Therefore, when the projection 44D engages lightly with one of the recessed parts 44E, the user has a feeling of resistance such that the fixed plate 44C is fixed at a predetermined angular position.

As shown in FIG. 4, corners of the projection 44D and each of the recessed parts 44E are formed to have a round shape so as to prevent the projection 44D from being hooked strongly to the recessed parts 44E.

As shown in FIG. 1, the control unit 50 controls the internal units (10, 20, 30, 40 and 43) to achieve various functions. The control unit 50 is, for example, a microcomputer chip in which a CPU, a ROM and a RAM are embedded. In this configuration, the CPU of the control unit 50 controls the internal units (10, 20, 30, 40 and 43) in accordance with programs stored in the ROM of the control unit 50.

As described in detail below, the image formation device 1 displays an image obtained by the image reading unit 10, and subjects image data of the image to a rotation process when the user rotates the display panel unit 41. Then, the processed image data is outputted to a memory or is printed on a sheet of paper.

Figure 7A:
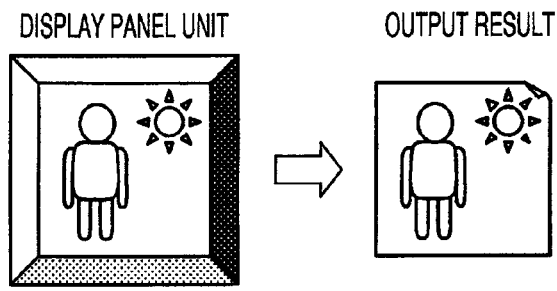
FIG. 7A shows an example of an output image obtained from a displayed image without applying a rotation process to the displayed image.
Figure 7B:
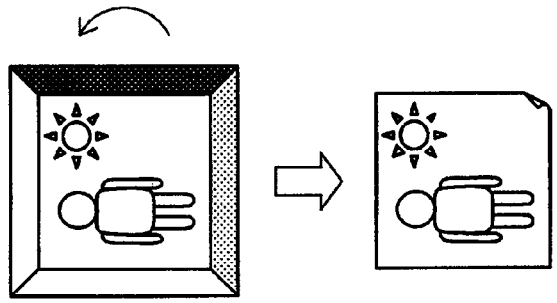
FIG. 7B shows an example of an output image obtained by rotating the displayed image by 90 degrees.

FIG. 7A shows an example of an output image obtained from a displayed image without applying the rotation process to the displayed image. FIG. 7B shows an example of an output image obtained by rotating the displayed image by 90 degrees.

Figure 6:
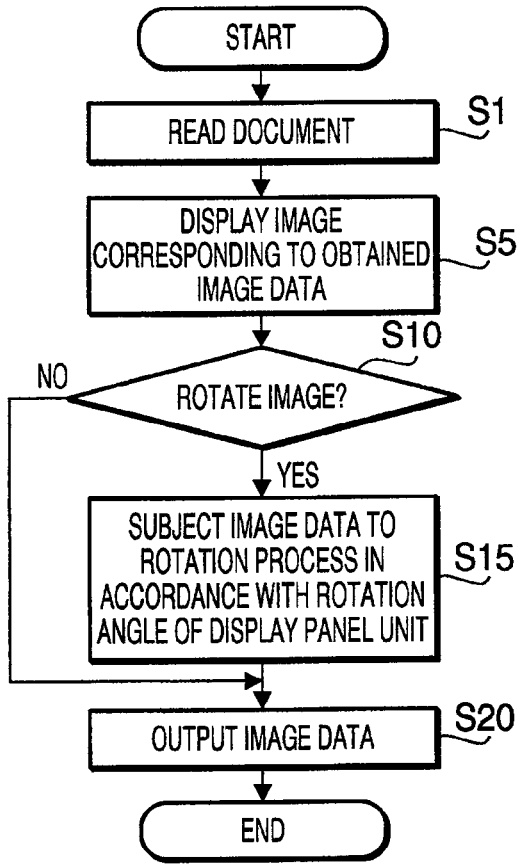
FIG. 6 is a flowchart illustrating image data processing executed by the image formation device according to the first embodiment.

FIG. 6 is a flowchart illustrating image data processing executed by the control unit 50 according to the first embodiment. The image data processing is started when a start button for starting the image data processing provided on the operation unit 30 is pressed by the user.

When the image data processing is started, the control unit 50 starts to read an image from a document, and image data of the read image is stored in the RAM of the control unit 50 (step S1). After the reading of the image is finished, the read image is displayed on the display panel unit 41 (step S5). Then, the control unit 50 judges whether the display panel unit 41 has been rotated in accordance with a detection signal of the angle detection unit 43 (step S10).

If the control unit 30 judges that the display panel unit 41 has been rotated (S10: YES), the image data is subjected to the rotation process in accordance with a rotation angle (hereafter, frequently referred to as a detected angle) detected by the angle detection unit 43 (step S43). Then, the rotated image data is outputted (step S20). If it is judged in step S10 that the display panel unit 41 has not been rotated (S10: NO), the image data is outputted without being subjected to the rotation process, as shown in FIG. 7A (step S20).

According to the first embodiment, it is possible to subject the image data to the rotation process by rotating the display panel unit 41 on which the obtained image is displayed. Such a configuration makes it possible to allow a user to rotate an image through an intuitive operation.

The angle adjustment unit 44 adjusts the rotation of the display panel unit 41 such that the display panel unit 41 is fixed lightly at a predetermined angular position. Therefore, the user is able to easily fix the display panel unit 41 at a predetermined angular position. Consequently, operability for rotating the display panel unit 41 can be enhanced.

Second Embodiment

Hereafter, an image formation device according to a second embodiment is described. Since the hardware configuration of the image formation device according to the second embodiment is substantially the same as that of the first embodiment, FIGS. 1-5 are also referred to for explanations of the second embodiment. In the following only the feature of the second embodiment is described.

In this embodiment, the image reading unit 10 has a fine reading mode and a simple reading mode. The image formation device 1 reads an image from a document in the simple reading mode to display the image on the display panel unit 41. For an output to the image forming unit 20 or an external computer, the image formation device 1 obtains image data by reading the document in the fine reading mode.

The fine reading mode is a reading mode for obtaining image data to be subjected to the rotation process or to be used as output data. For example, in the fine reading mode, an image is read from a document in resolutions of 600 dpi or higher. The simple reading mode is a reading mode in which an image is read from a document in lower resolution than that of the fine reading mode.

Figure 8:
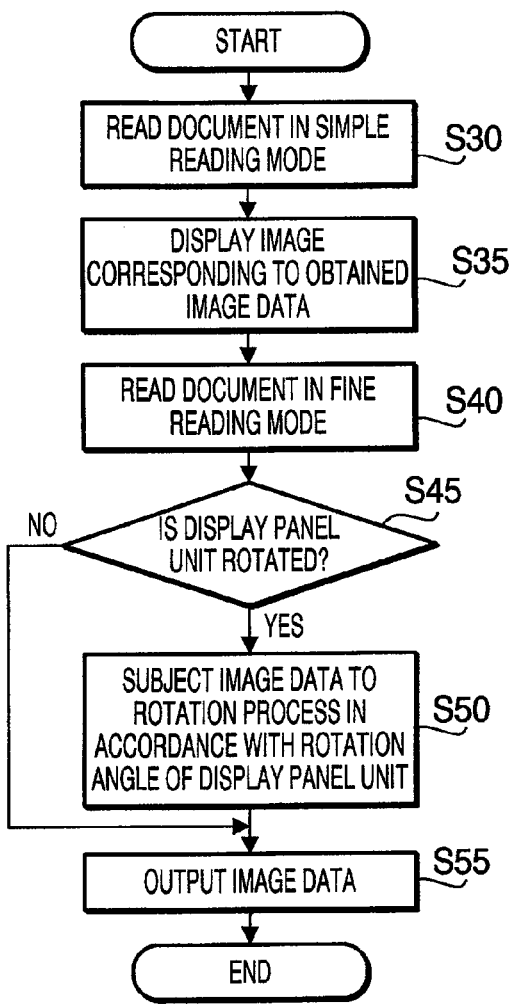
FIG. 8 is a flowchart illustrating image data processing executed by the image formation device according to a second embodiment.

FIG. 8 is a flowchart illustrating image data processing executed by the control unit 50 according to the second embodiment. The image data processing is started when the start button for starting the image data processing provided on the operation unit 30 is pressed.

First, the control unit 50 starts to read an image from a document in the simple reading mode, and image data of the read image is stored in the RAM of the control unit 50 (step S30). After the reading is finished, the control unit 50 displays the image on the display panel unit 51 (step S35).

Then, the control unit 50 starts to read an image from the document again in the fine reading mode, and image data of the read image is stored in the RAM of the control unit 50 (step S40).

Then, the control unit 50 judges whether the display panel unit 41 has been rotated based on the detection signal of the angle detection unit 43 (step S45). If the display panel unit 41 has been rotated (S45: YES), the image data obtained in the fine reading mode is subjected to the rotation process in accordance with the detected angle (step S50). Next, the rotated image data is outputted (step S55).

If the display panel unit 41 has not been rotated (S45: NO), the image data obtained in the fine reading mode is outputted without being subjected to the rotation process, as shown in FIG. 7A.

In this embodiment, the image obtained in the simple reading mode is displayed on the display panel unit 41. Therefore, it is possible to decrease the time period required for displaying an image read from a document in comparison with the case where an image read from a document in the fine reading mode is displayed on the display panel unit 41.

Third Embodiment

Hereafter, an image formation device according to a third embodiment is described. Since the hardware configuration of the image formation device according to the third embodiment is substantially the same as that of the first embodiment, FIGS. 1-5 are also referred to for explanations of the third embodiment. In the following only the feature of the third embodiment is described.

In this embodiment, if the size of a document to be read is different from an output paper size set by the user, the image formation device 1 enlarges or reduces the size of an obtained image in accordance with the output paper size. It is noted that the user is allowed to set the output paper size through the operation unit 30 and the display unit 40.

Figure 9A:
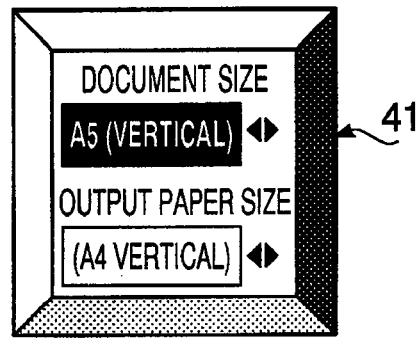
FIG. 9A is an example of a setting screen displayed on the display panel unit to allow a user to set the size of a document and the output paper size.
Figure 9B:
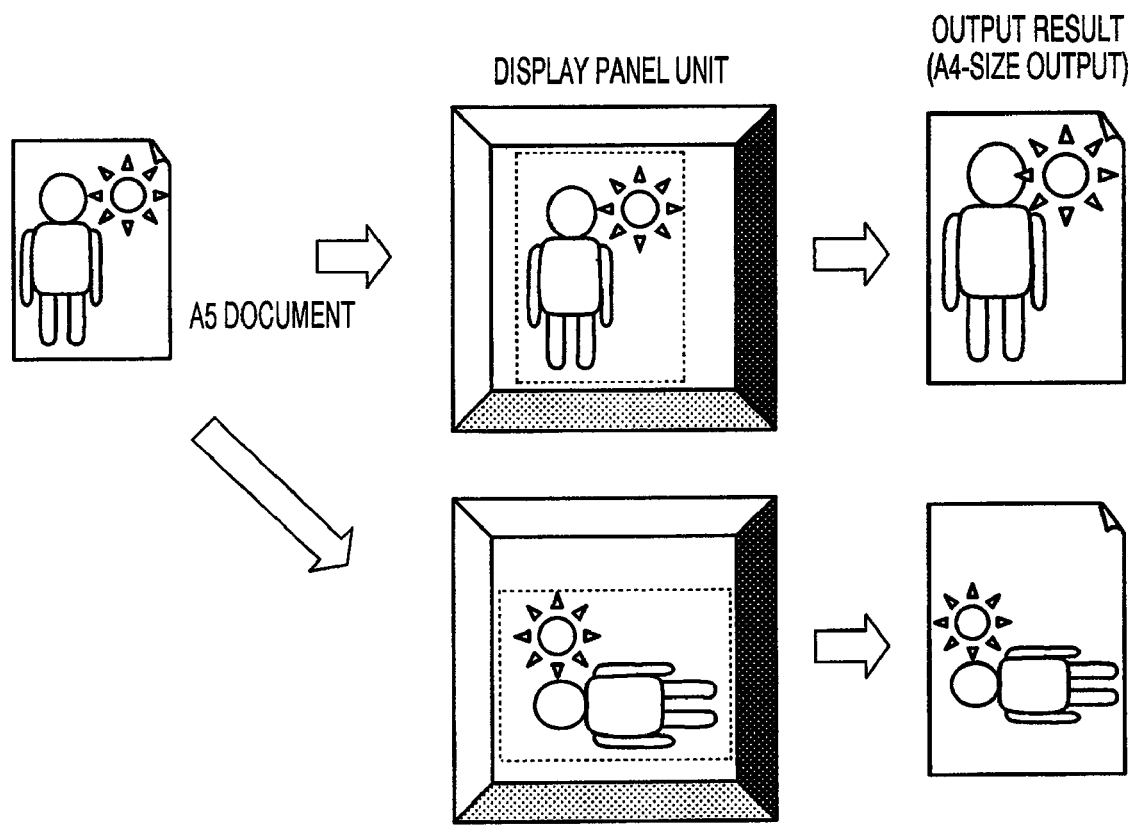
FIG. 9B is an explanatory illustration for explaining a processing result of the image data processing.

FIG. 9A is an example of a setting screen displayed on the display panel unit 41 to allow the user to set the size of a document and the output paper size. FIG. 9B is an explanatory illustration for explaining a processing result of the image data processing.

Figure 10:
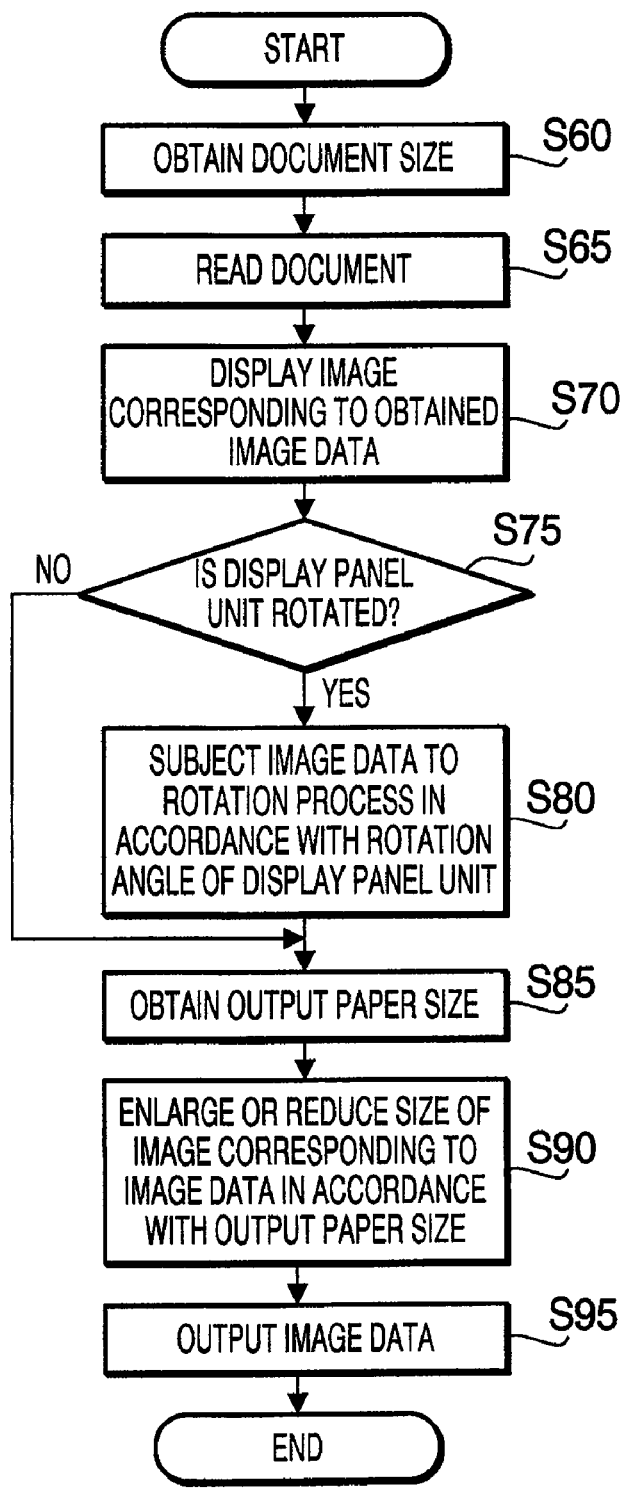
FIG. 10 is a flowchart illustrating image data processing executed by the image formation device according to a third embodiment.

FIG. 10 is a flowchart illustrating image data processing executed by the control unit 50 according to the third embodiment. The image data processing is started when the start button for starting the image data processing provided on the operation unit 30 is pressed.

First, the control unit 50 obtains the size of a document set by the user (step S60). Then, the reading is started in the fine reading mode, and the image data of the read image is stored in the RAM of the control unit 50 (step S65). After the reading of the document is finished, the image is displayed on the display panel unit 41 (step S70).

Then, the control unit 50 judges whether the display panel unit 41 has been rotated based on the detection signal of the angle detection unit 43 (step S75). If the display panel unit 41 has been rotated (S75: YES), the image data is subjected to the rotation process in accordance with the detected angle (step S80). Then, the control unit 50 obtains the output paper size set by the user through the setting screen (step S85).

If the display panel unit 41 has not been rotated (S75: NO), the control unit 50 obtains the output paper size set by the user through the setting screen, without subjecting the image data to the rotation process (step S85). Next, the control unit 50 enlarges or reduces the size of the image (i.e., the image which is not rotated or the image which has been rotated) to match the output paper size set by the user, as illustrated in FIG. 9B (step S90). Then, the processed image data is outputted (step S95).

As described above, if the output paper size is different from the size of a document to be read, the size of the read image is enlarged or reduced to match the output paper size, and thereafter the processed image data is outputted (or printed). Such a configuration makes it possible to enhance usability of the image reading device 1.

Fourth Embodiment

Hereafter, an image formation device according to a fourth embodiment is described. Since the hardware configuration of the image formation device according to the fourth embodiment is substantially the same as that of the first embodiment, FIGS. 1-5 are also referred to for explanations of the fourth embodiment. In the following only the feature of the fourth embodiment is described.

The image formation device 1 has the fine reading mode and the simple reading mode. In this embodiment, if the flat bed reading unit 12 is used to read an image from a document, an image obtained in the simple reading mode is displayed on the display panel unit 41. On the other hand, if the ADF 41 is used for the reading, the image obtained in the fine reading mode is displayed on the display panel unit 41.

Figure 11:
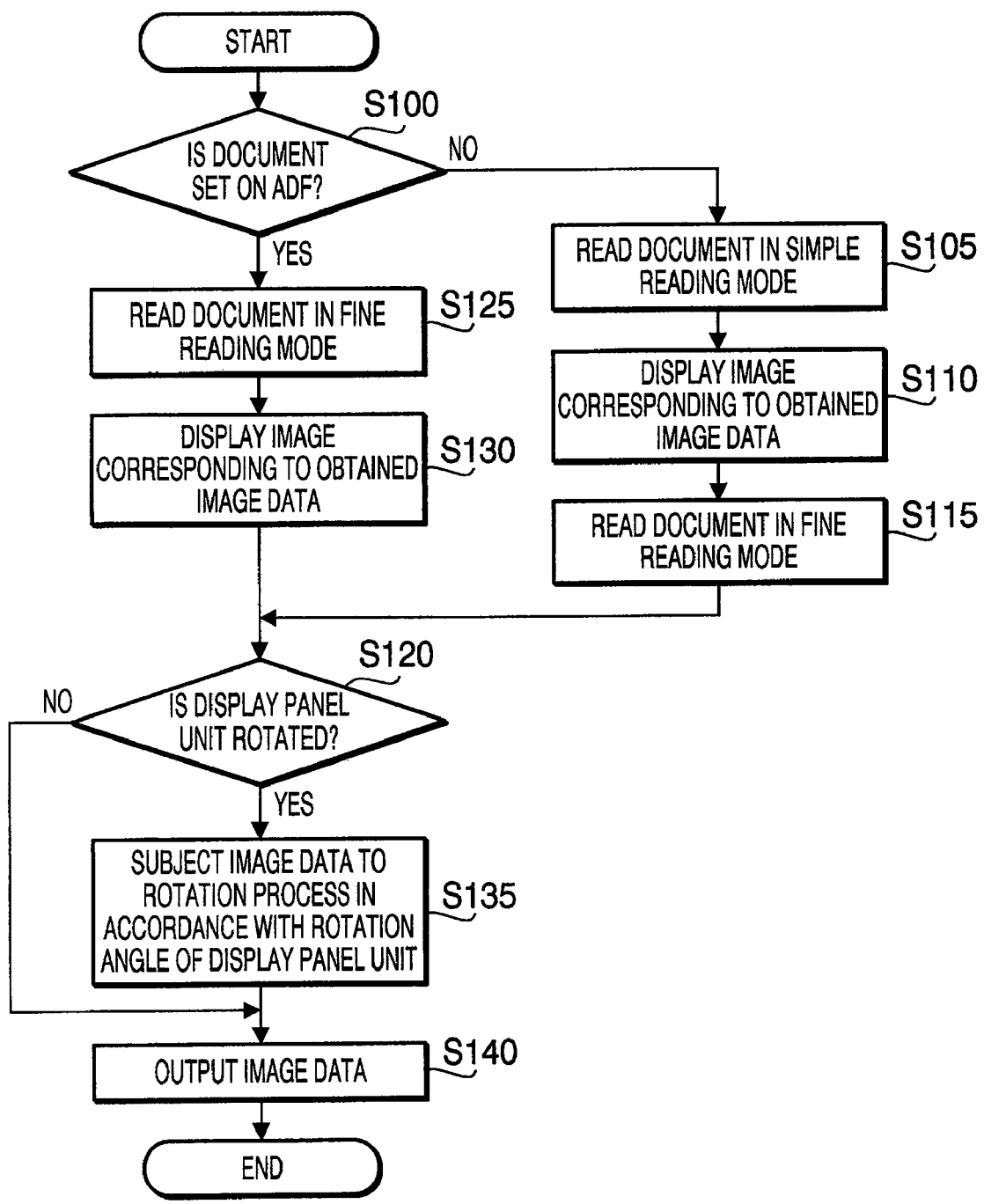
FIG. 11 is a flowchart illustrating image data processing executed by the image formation device according to a fourth embodiment.

FIG. 11 is a flowchart illustrating image data processing executed by the control unit 50 according to the fourth embodiment. The image data processing is started when the start button for starting the image data processing provided on the operation unit 30 is pressed.

First, the control unit 50 judges whether a document is placed on the ADF 14 (step S100). More specifically, the ADF 14 is provided with a sensor for detecting presence/absence of a document. In step S100, the control unit 50 makes a judgment regarding presence/absence of a document based on a detection signal from the sensor of the ADF 14.

If no document is placed on the ADF 14 (S100: NO), the control unit 50 regards the document as being placed on the flat bed reading unit 12, and starts to read the document in the simple reading mode, and thereafter stores image data of the read image in the RAM of the control unit 50 (step S105). Then, the image corresponding to the image data stored in the RAM is displayed on the display panel unit 41 (step S110).

Next, the image formation device 1 starts to read an image from the document in the fine reading mode while displaying the image obtained in the simple reading mode on the display panel unit 41, and thereafter stores the obtained image data in the RAM of the control unit 50 (step S115). Then, control proceeds to step S120.

If it is judged in step S100 that a document is placed on the ADF 14 (S100: YES), the control unit 50 starts to read the document in the fine reading mode, and the obtained image data is stored in the RAM of the control unit 50 (step S125). Then, the image corresponding to the obtained image data is displayed on the display panel unit 41 (step S130). Next, control proceeds to step S120.

In step S120, the control unit 50 judges whether the display panel unit 41 has been rotated based on the detection signal of the angle detection unit 43 (step S120). If the display panel unit 41 has been rotated (S120: YES), the image data is subjected to the rotation process in accordance with the detected angle (step S135). Then, the processed image data is outputted (step S140).

If it is judged in step S120 that the display panel unit 41 has not been rotated (S120: NO), the image data is outputted without being subjected to the rotation process.

The user is able to selectively use the ADF 14 or the flat bed reading unit 12 to read an image from a document. Regarding use of the flat bed reading unit 12, a relative position of a document with respect to the flat bed reading unit 12 stays unchanged even if the reading operation is executed repeatedly.

On the other hand, regarding use of the ADF 14, there is a high possibility that a relative position of the document with respect to the automatic read section 13 varies each time the document is read. Therefore, even if the rotation angle is determined for the image data obtained in the simple reading mode, a relative position of the document with respect to the automatic read section 13 varies when the document is read next in the fine reading mode. Consequently, it becomes impossible to rotate the image at an angular position intended by the user.

For this reason, in this embodiment, when the ADF 14 is used, the image data obtained in the fine reading mode is used. Such a configuration makes it possible to rotate the image as intended by the user.

Fifth Embodiment

Hereafter, an image formation device according to a fifth embodiment is described. Since the hardware configuration of the image formation device according to the fifth embodiment is substantially the same as that of the first embodiment, FIGS. 1-5 are also referred to for explanations of the fifth embodiment. In the following, only the feature of the fifth embodiment is described.

As described in detail below, in this embodiment, the detected angle detected by the angle detection unit 43 is used for the reading operation for another document.

FIG. 12 is a flowchart illustrating image data processing executed by the control unit 50 according to the fifth embodiment. The image data processing is started when the start button for starting the image data processing provided on the operation unit 30 is pressed in the situation where the number of sheets to be read has been set by the user through the operation unit 30 and the display unit 40.

First, the control unit 50 starts reading in the fine reading mode, and stores the image data corresponding to the read image in the RAM of the control unit 50 (step S150). After the reading of the document is finished, the control unit 50 displays the obtained image on the display panel unit 41 (step S155).

Then, the control unit 50 judges whether the display panel unit 41 has been rotated based on the detection signal of the angle detection unit 43 (step S160). If the display panel unit 41 has been rotated (S160: YES), the image data is subjected to the rotation process in accordance with the detected angle (step S165). Then, the processed image data is outputted (step S170).

Next, the control unit 50 displays a message on the display panel unit 41 as shown in FIG. 13 so as to inquire the user about whether to execute the rotation process for the remaining documents in accordance with the detected angle which is used in step S165 (step S175).

If the user inputs a command indicating acceptance of use of the detected angle (S175: YES), the control unit 50 stores the detected angle used in step S165 at a predetermined address in the RAM of the control unit 50 (step S180). Then, the control unit 50 reads the next document (step S185).

On the other hand, if the user does not accept use of the detected angle (S175: NO), the control unit 50 reads the next document and stores the obtained image data in the RAM without storing the detected angle used in step S165 (step S185).

Next, the control unit 50 judges whether the detected angle has been stored at the predetermined address in the RAM (step S190). If the detected angle has been stored (S190: YES), the image data is subjected to the rotation process in accordance with the stored detected angle (step S195). Then, the processed image data is outputted (step S200).

If the detected angle has not been stored (S190: NO), control proceeds to step S205 where the image obtained in step S185 is displayed on the display panel unit 41. Then, the control unit 50 judges whether the display panel unit 31 has been rotated based on the detection signal of the angle detection unit 43 (step S210).

If the display panel unit 41 has been rotated (S210: YES), the image data is subjected to the rotation process in accordance with the detected angle (step S215). Then, the processed image data is outputted (step S200). If it is judged in step S210 that the display panel unit 41 has not been rotated (S210: NO), the image data is outputted without being subjected to the rotation process (step S200).

Next, the control unit 50 judges whether all of the document have been subjected to the reading operation (step S220). If all of the documents have not been read (S220: NO), control returns to step S185 to read the next document. If all of the document have been read (S220: YES), the image data processing terminates.

In this embodiment, the initially used rotation angle (detected angle) is also applied to the rotation process for the remaining documents. Such a configuration eliminates the need for rotating the display panel unit 41 each time a document is read. Consequently, usability of the reading function can be enhanced.

Sixth Embodiment

Hereafter, an image formation device according to a sixth embodiment is described. Since the hardware configuration of the image formation device according to the sixth embodiment is substantially the same as that of the first embodiment, FIGS. 1-5 are also referred to for explanations of the sixth embodiment. In the following, only the feature of the sixth embodiment is described.

More specifically, the sixth embodiment is can be regarded as a variation of the fifth embodiment. As described above, in the fifth embodiment, the rotation angle stored in the RAM is applied for the predetermined number of sheets which has been set by the user in advance. By contrast, according to the sixth embodiment, once the rotation angle is stored in the RAM, the stored rotation angle is used for subsequent reading operations.

Figure 14:
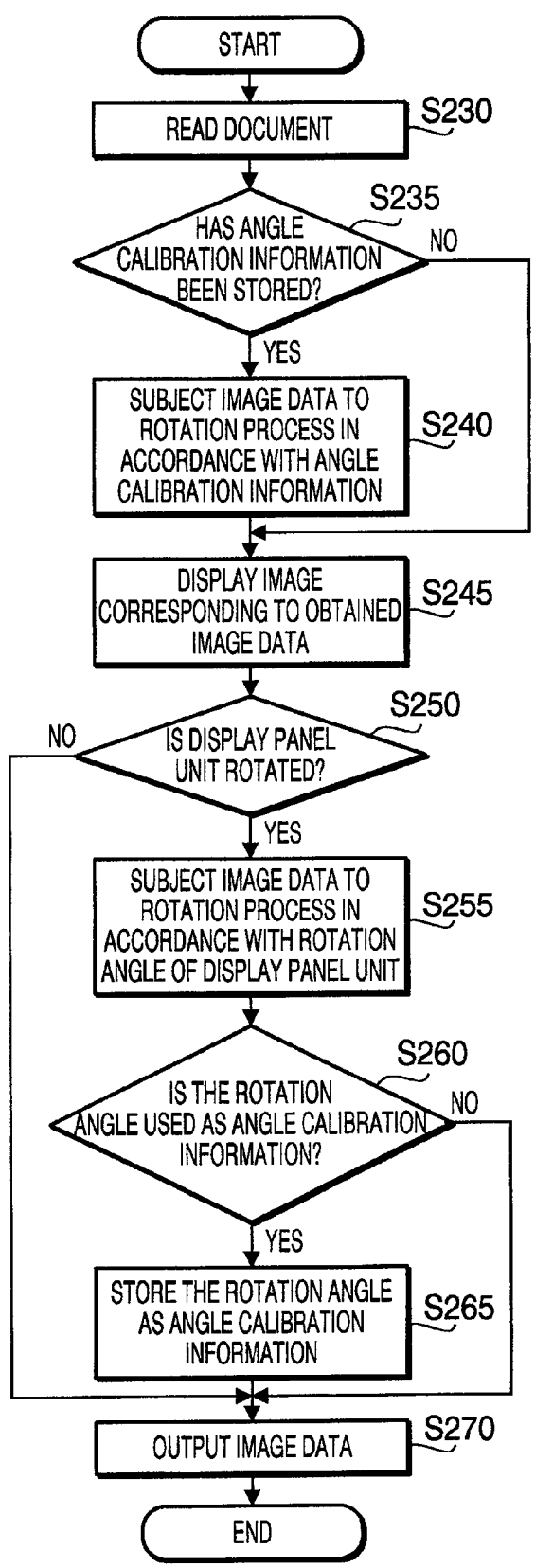
FIG. 14 is a flowchart illustrating image data processing executed by the image formation device according to a sixth embodiment.

FIG. 14 is a flowchart illustrating image data processing executed by the control unit 50 according to the sixth embodiment. The image data processing is started when the start button for starting the image data processing provided on the operation unit 30 is pressed.

First, the control unit 50 starts to read a document in the fine reading mode, and image data corresponding to the read image is stored in the RAM of the control unit 50 (step S230). After the reading is finished, the control unit 50 judges whether the rotation angle has been stored at the predetermined address in the RAM of the control unit 50 (step S235). Hereafter, the rotation angle which has been stored at the predetermined address in the RAM is referred to as angle calibration information.

If the control unit 50 judges that the angle calibration information has been stored in the RAM (S235: YES), the control unit 50 subjects the image data to the rotation process in accordance with the stored angle calibration information (step S240). Then, the image corresponding to the processed image data is displayed on the display panel unit 41 (step S245).

If the angle calibration information has not been stored in the RAM (S235: NO), the control unit 50 displays the image corresponding to the obtained image data without executing the rotation process (step S245).

Next, the control unit 50 judges whether the display panel unit 41 has been rotated based on the detection signal of the angle detection unit 43 (step S250). If the display panel unit 41 has been rotated (S250: YES), the image data is subjected to the rotation process in accordance with the detected angle (step S255). Then, the control unit 50 inquires the user about whether to use the currently detected angle used in step S255 as angle calibration information in the future execution of the rotation process (step S260).

If a user input indicating that the currently detected angle should be used as the angle calibration information is inputted (S260: YES), the currently detected angle is stored at the predetermined address in the RAM (step S265). Then, the processed image data is outputted (step S270).

If a user input indicating the currently detected angle should not be used as the angle calibration information is inputted (S260: NO) or if the display panel unit 41 has not been rotated (S250: NO), the control unit 50 outputs the image data without executing the rotation process.

In this embodiment, the image rotated in accordance with the angle calibration information is displayed on the display panel unit 41. Such a configuration allows the user to view the image rotated in accordance with the angle calibration information.

Figure 15:
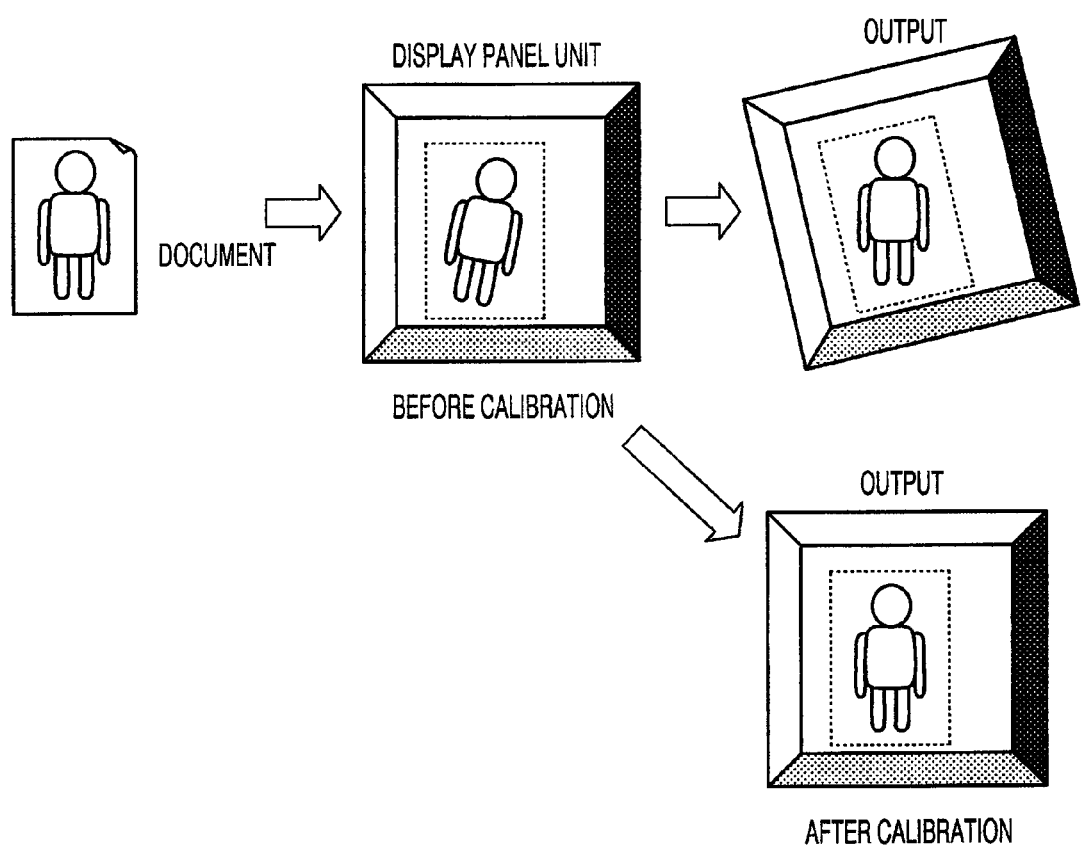
FIG. 15 is an explanatory illustration for explaining calibration of an image based on angle calibration information.

FIG. 15 is an explanatory illustration for explaining calibration of an image based on the angle calibration information. In FIG. 15, a displayed image before calibration, a rotated state of the display panel unit 41 for calibration, and a displayed image after calibration are illustrated. By thus utilizing the calibration function, it is possible to constantly obtain a suitable output image.

Seventh Embodiment

Hereafter, an image formation device according to a seventh embodiment is described. Since the hardware configuration of the image formation device according to the seventh embodiment is substantially the same as that of the first embodiment, FIGS. 1-5 are also referred to for explanations of the seventh embodiment. In the following, only the feature of the seventh embodiment is described.

In this embodiment, an image obtained from a particular type of document is rotated such that orientation of the obtained image matches predetermined orientation of the particular type of document.

Assuming that an envelope is to be subjected to the reading operation and that a typical writing style for an envelope is to write letters in a horizontal direction, in this case the image formation device 1 rotates the image such that the letters are arranged in a horizontal direction on the image if the envelope is placed by the user on the image formation device 1 in a vertically oriented direction. FIGS. 16A-16D are explanatory illustrations for explaining image data processing for an envelope.

Figure 17:
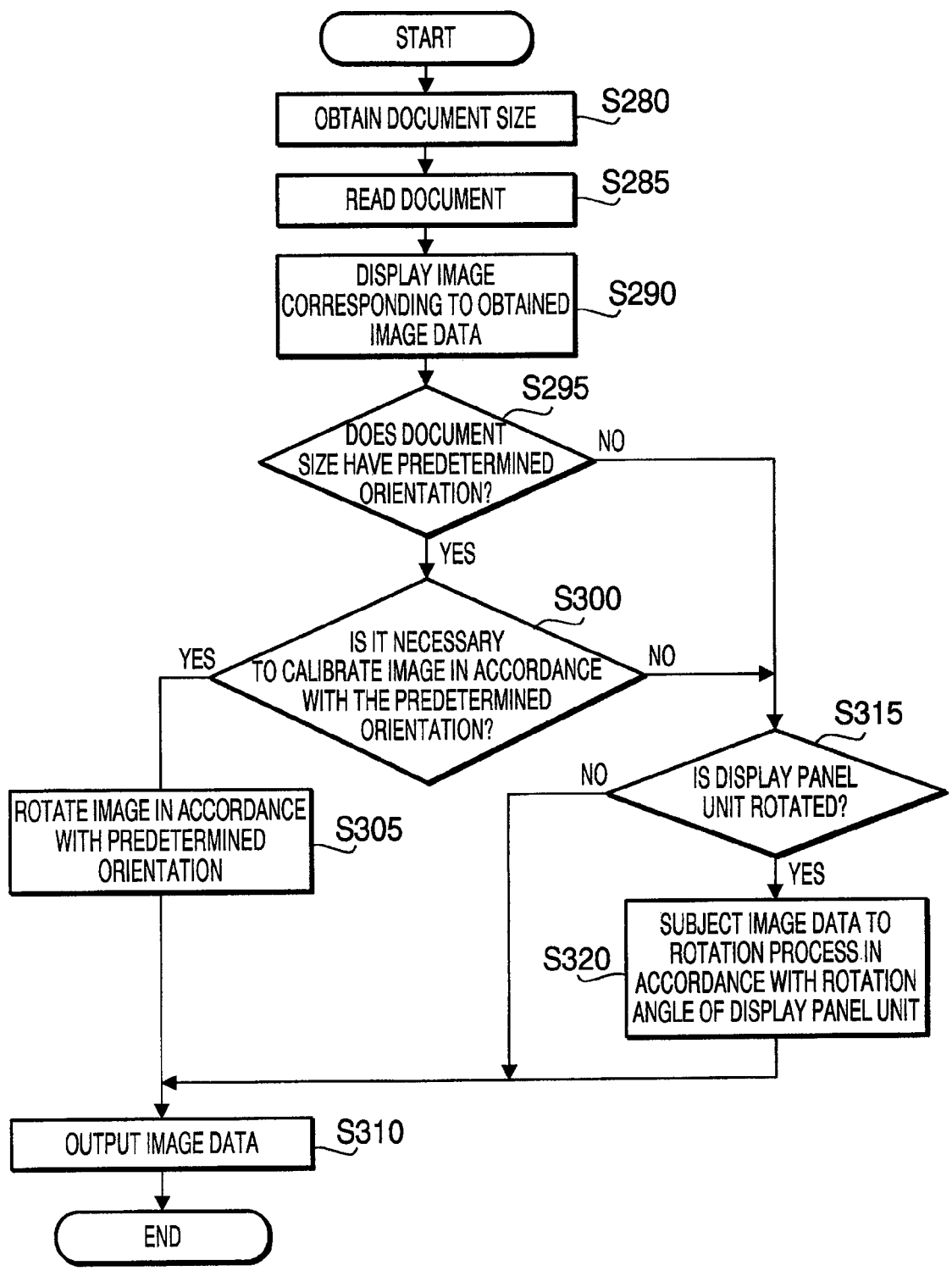
FIG. 17 is a flowchart illustrating image data processing executed by the image formation device according to a seventh embodiment.

FIG. 17 is a flowchart illustrating image data processing executed by the control unit 50 according to the seventh embodiment. In the following, it is assumed that the size of a document and the type of the document have been set by the user. In the image data processing, a direction of arrangement of images in the document is determined in accordance with the size of the document and the type of the document set by the user in advance.

The image data processing is started when the start button for starting the image data processing provided on the operation unit 30 is pressed in the state where the size of the document and the type of the document have been set by the user through the operation unit 30 and the display unit 40.

First, the control unit 50 obtains the size of the document and the type of the document, and stores the obtained size and type of the document in the RAM of the control unit 50 (step 280). Then, the control unit 50 starts reading of the document (step S285).

After the reading of the document is finished. The control unit 50 displays the obtained image on the display panel unit 41 (step S290). Then, the control unit 50 judges whether the document has predetermined orientation based on the size and type of the document (step S295).

If the document has predetermined orientation (S295: YES), the control unit 50 inquires of the user about whether to correct the orientation of the displayed image so that the orientation of the displayed image is changed to the predetermined orientation (step S300).

If a user input for correcting the image is inputted (S300: YES), the image is rotated to have the predetermined orientation (step S305). Then, the processed image data is outputted (step S310).

If a user input for not correcting the image is inputted (S300: NO) or the control unit 50 judges that the image does not have the predetermined orientation (S295: NO), control proceeds to step S315. In step S315, the control unit 50 judges whether the display panel unit 41 has been rotated based on the detection signal of the angle detection unit 43. If the display panel unit 41 has been rotated (S315: YES), the image data is subjected to the rotation process in accordance with the detected angle (step S320). Then, the processed image data is outputted (step S310).

If the display panel unit 41 has not been rotated (S315: NO), the control unit 50 outputs the image data without executing the rotation process.

In this embodiment, if predetermined orientation is set for a predetermined type of document, an image obtained from the predetermined type of document is rotated without manually rotating the display panel unit 41 each time reading of the document is executed.

In this embodiment, the orientation of the obtained image is determined based on the size and the type of the document which have been set in advance. However, the orientation of the image (e.g., a arrangement direction of letters in the image) may be determined by analyzing the arrangement direction of letters in the image through use of an OCR function.

Eighth Embodiment

Hereafter, an image formation device according to an eighth embodiment is described. Since the hardware configuration of the image formation device according to the eighth embodiment is substantially the same as that of the first embodiment, FIGS. 1-5 are also referred to for explanations of the eighth embodiment. In the following, only the feature of the eighth embodiment is described.

In the above described embodiments, the judgment as to whether the display panel unit 41 is rotated is made after reading of a document is executed. By contrast, in this embodiment, a judgment as to whether the display panel unit is rotated is made before execution of reading of a document.

Figure 18:
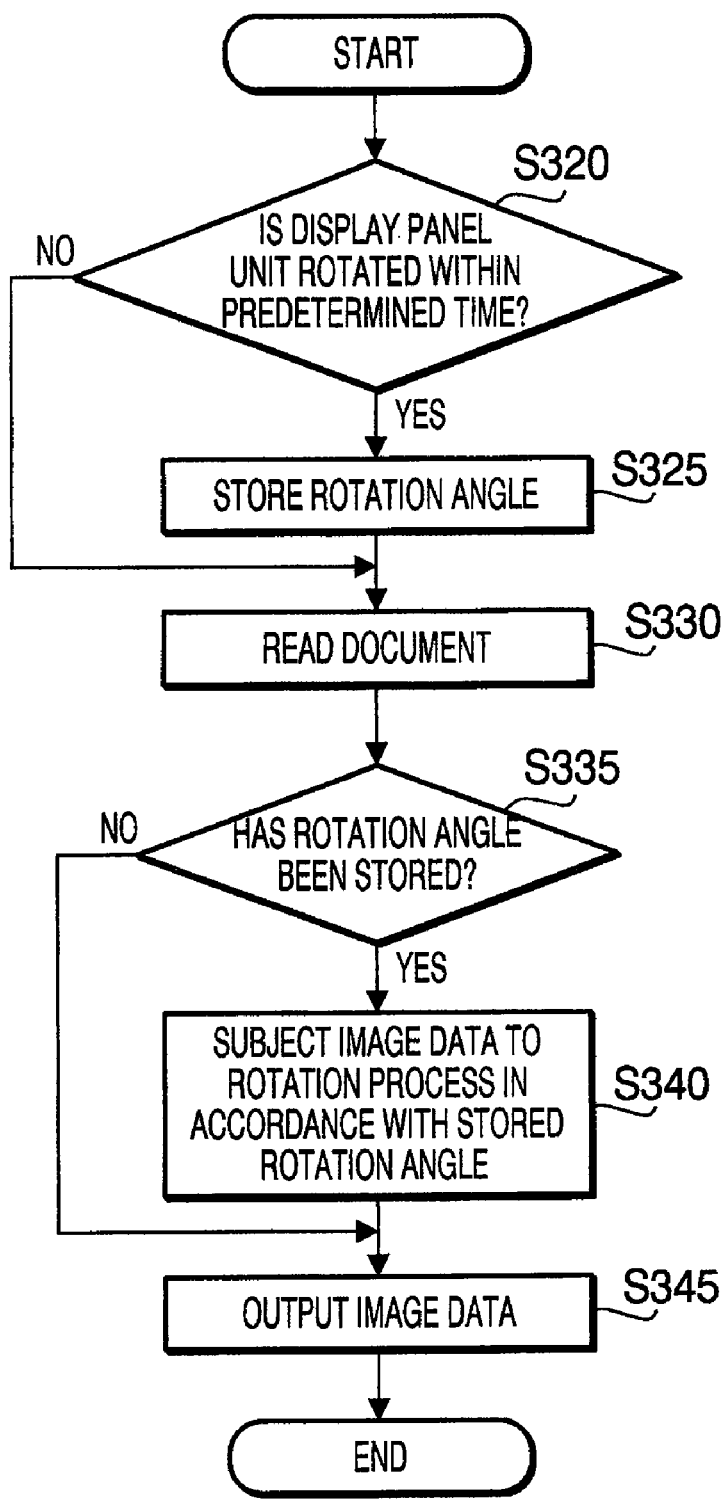
FIG. 18 is a flowchart illustrating image data processing executed by the image formation device according to an eighth embodiment.

FIG. 18 is a flowchart illustrating image data processing executed by the control unit 50 according to the eighth embodiment. The image data processing is started when the start button for starting the image data processing provided on the operation unit 30 is pressed.

First, the control unit 50 judges whether the display panel unit 41 is rotated within a predetermined time period based on from finish of pressing of the start button, based on the detection signal of the angle detection unit 43 (step S320).

If the control unit 50 judges that the display panel unit is rotated within the predetermined time period (S320: YES), the detection angle is stored at a predetermined address in the RAM (step S325). Then, control proceeds to step S330. If the control unit 50 judges that the display panel unit is not rotated within the predetermined time period (S320: NO), control proceeds to step S330 without storing the detection angle.

In step S330, the control unit 50 starts to read the document. Next, the control unit 50 judges whether the detection angle has been stored at the predetermined address in the RAM (step S335). If the detection angle has been stored (S335: YES), the control unit 50 subjects the obtained image data to the rotation process in accordance with the stored detection angle (step S340). Then, control proceeds to step S345.

If the detection angle has not been stored (S335: NO), control proceeds to step S345 without executing the rotation process. In step S345, the image data is outputted.

Ninth Embodiment

Hereafter, an image formation device according to a ninth embodiment is described. Since the hardware configuration of the image formation device according to the ninth embodiment is substantially the same as that of the first embodiment, FIGS. 1-5 are also referred to for explanations of the ninth embodiment. In the following, only the feature of the ninth embodiment is described.

More specifically, the ninth embodiment can be regarded as a variation of the sixth embodiment. In the sixth embodiment, calibration of the rotation angle is conduced when output of the image data is executed. By contrast, in this embodiment, a dedicated calibration mode is provided so that a calibrated rotation angle is applied to a normal reading operation.

Therefore, a calibration mode process according to the ninth embodiment is achieved by removing steps S255 and S270 from the image data processing shown in FIG. 14. In the following, the image data processing according to the ninth embodiment is explained with reference to FIG. 14.

The calibration mode process is started when the start button for starting the image data processing provided on the operation unit 30 is pressed in the state where the image formation device 1 is set to a calibration mode by the user through the operation unit 30 and the display unit 40.

First, the control unit 50 starts to read the document and stores the image data corresponding to the obtained image in the RAM of the control unit 50 (step S230). After the reading is finished, the control unit 50 judges whether the angle calibration information has been stored at the predetermined address in the RAM of the control unit 50 (step S235).

If the control unit 50 judges that the angle calibration information has been stored in the RAM (S235: YES), the control unit 50 subjects the image data to the rotation process in accordance with the stored angle calibration information (step S240). Then, the image corresponding to the processed image data is displayed on the display panel unit 41 as shown in FIG. 15 (step S245).

If the angle calibration information has not been stored in the RAM (S235: NO), the control unit 50 displays the image corresponding to the obtained image data without executing the rotation process as illustrated in FIG. 15 (see "a displayed image before calibration") (step S245). It is noted that since in the calibration mode the obtained image data is used only for display on the display panel unit 41, the reading may be executed in the simple reading mode to execute more effectively the rotation process of the image data in step S240 or the displaying operation in step S245.

Next, the control unit 50 judges whether the display panel unit 41 has been rotated based on the detection signal of the angle detection unit 43 (step S250). If the display panel unit 41 has been rotated (S250: YES), the control unit 50 judges that the user did not satisfied with the rotated angle of the displayed image before calibration (see FIG. 15) and therefore rotated the display panel unit 41. In this case, the control unit 50 inquires the user about whether to use the currently detected angle used for the rotation process as angle calibration information in the future execution of the rotation process (step S260).

If the user input indicating that the currently detected angle should be used as the angle calibration information is inputted (S260: YES), the currently detected angle is stored at the predetermined address in the RAM (step S265). Then, the calibration process terminates.

If a user input indicating the currently detected angle should not be used as the angle calibration information is inputted (S260: NO) or if the display panel unit 41 has not been rotated (S250: NO), the calibration process terminates.

By thus executing the calibration process, an image obtained through the normal reading operation can be displayed on the display panel unit 41 as illustrated in a lower right part of FIG. 15 ("a displayed image after calibration").

Although the present invention has been described in considerable detail with reference to certain preferred embodiments thereof, other embodiments are possible.

In the above described embodiments, the invention is applied to the image formation device having the printing function and the scanner function. However, the invention can be applied to various types of devices, such as, an image reading device or a displaying device.

In the above described embodiments, the display panel unit 41 (e.g., an LCD) is configured to be rotatable. However, the image formation device may be configured to display a virtual image of the display panel unit 41 and to allow the user to rotate the virtual image of the display panel unit 41.

More specifically, a touch panel may be mounted on a display unit of an image formation device. In this case, the image formation device displays a virtual display panel on the display unit such that the user is able to rotate the virtual display panel by moving the user's finger along a surface of the touch panel.

In the above mentioned embodiment, the angle adjustment unit 44 is configured such that the rotation plate 44A has projection 44D on the outer periphery, and the fixed plate 44C has, on the inner periphery, the recessed parts 44E with which the projection 44D lightly engage. However, various type of mechanical engagement between the rotation plate 44A and the fixed plate 44C may be employed. For example, the rotation plate 44A may have recessed portion on the outer periphery and the fixed plate 44C may have projections on the inner periphery.

What is claimed is:

1. A device, comprising:
    a display unit configured to display an input image corresponding to image data and to be rotatable with respect a body case of the device;
    a detection unit configured to detect a rotation amount and a rotation direction of the display unit; and
    a data processing unit configured to process the image data to produce an output image in which the input image is rotated in the same rotation direction and by the same rotation amount as detected by the detection unit.

2. The device according to claim 1, further comprising a reading unit configured to read the input image from a document,
    wherein the display unit displays the input image read by the reading unit.

3. The device according to claim 2, wherein:
    the reading unit has a fine reading mode of reading the input image from the document in a predetermined resolution to provide the image data to the data processing unit and a simple reading mode of reading the input image from the document in a resolution lower than the predetermined resolution; and
    the display unit displays the input image read by the reading unit in the simple reading mode.

4. The device according to claim 2, further comprising a conveying unit configured to convey a document to the reading unit,
    wherein the display unit displays the input image read by the reading unit in a fine reading mode of reading the input image from the document in a predetermined resolution to provide the image data to the data processing unit.

5. The device according to claim 2, further comprising a data rotation unit configured to process the image data to rotate the input image such that, for a predetermined type of physical document, orientation of the output image matches predetermined orientation defined for the predetermined type of physical document.

6. The device according to claim 2, wherein the display unit comprises an angle adjustment unit configured to adjust a rotation angle of the display unit such that the display unit is fixed at a predetermined angle.

7. The device according to claim 6, wherein the predetermined angle is an integral multiple of 90 degrees.

8. The device according to claim 2, further comprising:
    a designation unit configured to allow a user to designate whether to apply the rotation angle of the display unit detected by the detection unit to the image data; and
    a storage unit configured to store the rotation angle which the user designated as a rotation angle to be applied to the image data through the designation unit,
    wherein the data processing unit is configured to process the image data to rotate the input image in accordance with the rotation angle stored in the storage unit.

9. The device according to claim 8, wherein the display unit displays the output image.

10. The device according to claim 1, further comprising a print unit configured to print the output image.

* * * * *

UNITED STATES PATENT AND TRADEMARK OFFICE
CERTIFICATE OF CORRECTION

PATENT NO.        : 8,125,499 B2                                          Page 1 of 1
APPLICATION NO.   : 12/163253
DATED             : February 28, 2012
INVENTOR(S)       : Jun Yamada It is certified that error appears in the above-identified patent and that said Letters Patent is hereby corrected as shown below:

In Column 13, Claim 1, Line 33:
    Please delete "and"

In Column 13, Claim 1, Line 37:
    Please delete "by the detection unit." and insert
    -- by the detection unit; and an output unit configured to output the output image,
wherein the output unit is different from the display unit. --

In Column 14, Claim 10, Line 41:
    Please delete "further comprising" and insert -- wherein the output unit comprises --

Signed and Sealed this
Twenty-first Day of August, 2012

David J. Kappos
*Director of the United States Patent and Trademark Office*